(12) United States Patent
Moon et al.

(10) Patent No.: US 8,202,134 B2
(45) Date of Patent: Jun. 19, 2012

(54) ELECTRODE TERMINAL AND SECONDARY BATTERY INCLUDING THE SAME

(75) Inventors: Jong-Seok Moon, Yongin-si (KR); Tatsuya Hashimoto, Yongin-si (KR); Yong-Sam Kim, Yongin-si (KR); Jeong-Won Oh, Yongin-si (KR); Sang-Won Byun, Yongin-si (KR)

(73) Assignee: SB LiMotive Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 12/929,124

(22) Filed: Jan. 3, 2011

(65) Prior Publication Data

US 2011/0294367 A1  Dec. 1, 2011

(30) Foreign Application Priority Data

May 31, 2010 (KR) .................. 10-2010-0051441

(51) Int. Cl.
*H01R 4/10* (2006.01)
(52) U.S. Cl. ............................................. 439/878
(58) Field of Classification Search ............ 439/878, 439/801, 762, 517, 755, 766; 411/177, 112, 411/181; 429/178, 136, 137, 181, 61; 320/162
See application file for complete search history.

(56) References Cited

U.S. PATENT DOCUMENTS

| | | | | |
|---|---|---|---|---|
| 6,027,831 A * | 2/2000 | Inoue et al. | ............... | 429/181 |
| 6,126,493 A * | 10/2000 | Price et al. | .................... | 439/801 |
| 6,491,487 B1 * | 12/2002 | Wojciechowski | ............ | 411/181 |
| 6,830,490 B2 * | 12/2004 | Murakami et al. | ............ | 439/755 |
| 6,858,343 B2 * | 2/2005 | Wang | ............................. | 429/121 |
| 7,056,161 B2 * | 6/2006 | Delcourt et al. | ............... | 439/766 |
| 7,503,800 B2 * | 3/2009 | Siglock et al. | ................ | 439/517 |
| 7,745,046 B2 * | 6/2010 | Kim et al. | ..................... | 429/178 |
| 8,033,875 B1 * | 10/2011 | Maguire | ....................... | 439/762 |
| 2004/0131442 A1 * | 7/2004 | Dieckmann | ................... | 411/112 |
| 2005/0287430 A1 | 12/2005 | Kim et al. | | |
| 2008/0159824 A1 * | 7/2008 | Okada et al. | .................. | 411/177 |
| 2010/0000156 A1 * | 1/2010 | Salhoff | ........................... | 49/502 |

FOREIGN PATENT DOCUMENTS

| | | |
|---|---|---|
| JP | 2000-138055 A | 5/2000 |
| JP | 2001-327114 A | 11/2001 |
| JP | 2008-281209 A | 11/2008 |
| KR | 10 2002-0037743 A | 5/2002 |
| KR | 10 2007-0014657 A | 2/2007 |

OTHER PUBLICATIONS

European Search Report in EP 11157136.0-1227, dated May 12, 2011 (Moon, et al.).
Korean Office Action in KR 10-2010-0051441, dated Mar. 2, 2012 (Moon, et al.).

* cited by examiner

*Primary Examiner* — Alexander Gilman
(74) *Attorney, Agent, or Firm* — Lee & Morse, P.C.

(57) ABSTRACT

An electrode terminal and a secondary battery including the same, the electrode terminal including a screw member, the screw member including a flange on a lower outer peripheral surface thereof; and a coupling member including an upper portion bent so as to surround at least a part of the flange, and a lower portion bent so as to contact an internal surface of a cap assembly and coupled to the cap assembly.

17 Claims, 8 Drawing Sheets

ELECTRODE TERMINAL AND SECONDARY BATTERY INCLUDING THE SAME

BACKGROUND

1. Field

Embodiments relate to an electrode terminal and a secondary battery including the same.

2. Description of the Related Art

Secondary batteries can be charged and discharged, unlike primary batteries that cannot be recharged. Recently, large output secondary batteries using a non-aqueous electrolyte and having a high energy density have been developed. A low-capacity battery pack including one or a plurality of secondary batteries, which are wrapped in a package, may be used in a small-sized portable electronic device, e.g., a mobile phone or a notebook computer. A battery pack including several tens of secondary batteries that are connected to one another in series or in parallel may be included in a device, e.g., a hybrid car, an electric vehicle, or an electromotive bicycle, which requires a large amount of power.

Secondary batteries may include electrode terminals, through which unit cells may be electrically connected to each other. That is, several or several tens of secondary batteries may be connected to one another so as to assemble a battery pack.

SUMMARY

Embodiments are directed to an electrode terminal and a secondary battery including the same, which represent advances over the related art.

It is a feature of an embodiment to provide an electrode terminal that has high durability and does not deformed in the event of an external vibration or internally generated heat.

At least one of the above and other features and advantages may be realized by providing an electrode terminal including a screw member, the screw member including a flange on a lower outer peripheral surface thereof; and a coupling member including an upper portion bent so as to surround at least a part of the flange, and a lower portion bent so as to contact an internal surface of a cap assembly and coupled to the cap assembly.

The screw member may include a pillar portion, the pillar portion including a screw thread on an upper outer peripheral surface thereof, and the flange may have a diameter greater than a diameter of the pillar portion.

The upper portion of the coupling member may include a first pressing unit that is bent so as to surround the flange in one direction; and a second pressing unit that is bent so as to surround the flange in another direction.

At least one of the first pressing unit and the second pressing unit may include a groove therein, the groove corresponding to a shape of the screw member.

The upper portion of the coupling member may be coupled to the screw member by being bent so as to surround an entire lower portion of the screw member that includes the flange and is thereby coupled to the flange.

The coupling member may include at least one coupling bump thereon, and the lower portion of the screw member may include at least one coupling groove thereon, the coupling groove corresponding to the coupling bump.

The lower portion of the coupling member may include a shaft portion including an end portion, the end portion having a hollow pipe shape, and the end portion of the shaft portion may be divided into at least two sections, the divided end portion of the shaft portion being bent so as to contact the internal surface of the cap assembly.

At least one of the above and other features and advantages may also be realized by providing a secondary battery including a case accommodating an electrode assembly; a cap assembly sealing the case; and at least one pair of electrode terminals on the cap assembly, the at least one pair of electrode terminals being electrically connected to the electrode assembly, wherein each electrode terminal includes a screw member, the screw member including a flange on a lower outer peripheral surface thereof; and a coupling member including an upper portion bent so as to surround at least a part of the flange, and a lower portion bent so as to contact an internal surface of a cap assembly and coupled to the cap assembly.

The lower portion of the coupling member may pass through a hole in the cap assembly, and a first sealing member including an insulating material may be between the coupling member and an upper outer surface of the cap assembly.

A second sealing member including an insulating material may be between the coupling member and the internal surface of the cap assembly.

The secondary battery may further include a tap between the coupling member and the internal surface of the cap assembly so as to electrically connect the electrode terminal and the electrode assembly, the tap being bent at a predetermined angle.

The screw member may include a pillar portion, the pillar portion including a screw thread on an upper outer peripheral surface thereof, and the flange may have a diameter greater than a diameter of the pillar portion.

The upper portion of the coupling member may include a first pressing unit that is bent so as to surround the flange in one direction; and a second pressing unit that is bent so as to surround the flange in another direction.

At least one of the first pressing unit and the second pressing unit may include a groove therein, the groove corresponding to a shape of the screw member.

The upper portion of the coupling member may be coupled to the screw member by being bent so as to surround an entire lower portion of the screw member that includes the flange and is thereby coupled to the flange.

The coupling member may include at least one coupling bump thereon, and the lower portion of the screw member may include at least one coupling groove thereon, the coupling groove corresponding to the coupling bump.

The lower portion of the coupling member may include a shaft portion including an end portion, the end portion having a hollow pipe shape, and the end portion of the shaft portion may be divided into at least two sections, the divided end portion of the shaft portion being bent so as to contact the internal surface of the cap assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0051441, filed on Mar. 31, 2010, in the Korean Intellectual Property Office, and entitled: "Electrode Terminal Structure and Secondary Battery Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

The terminology used herein is for the purpose of describing particular embodiments only and is not intended to be limiting of the inventive concept. As used herein, the singular forms 'a', 'an', and 'the' are intended to include the plural forms as well, unless the context clearly indicates otherwise. It will be further understood that the terms 'comprises' and/or 'comprising,' when used in this specification, specify the presence of stated features, integers, operations, elements, and/or components, but do not preclude the presence or addition of one or more other features, integers, operations, elements, components, and/or groups thereof. It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Figure 1:
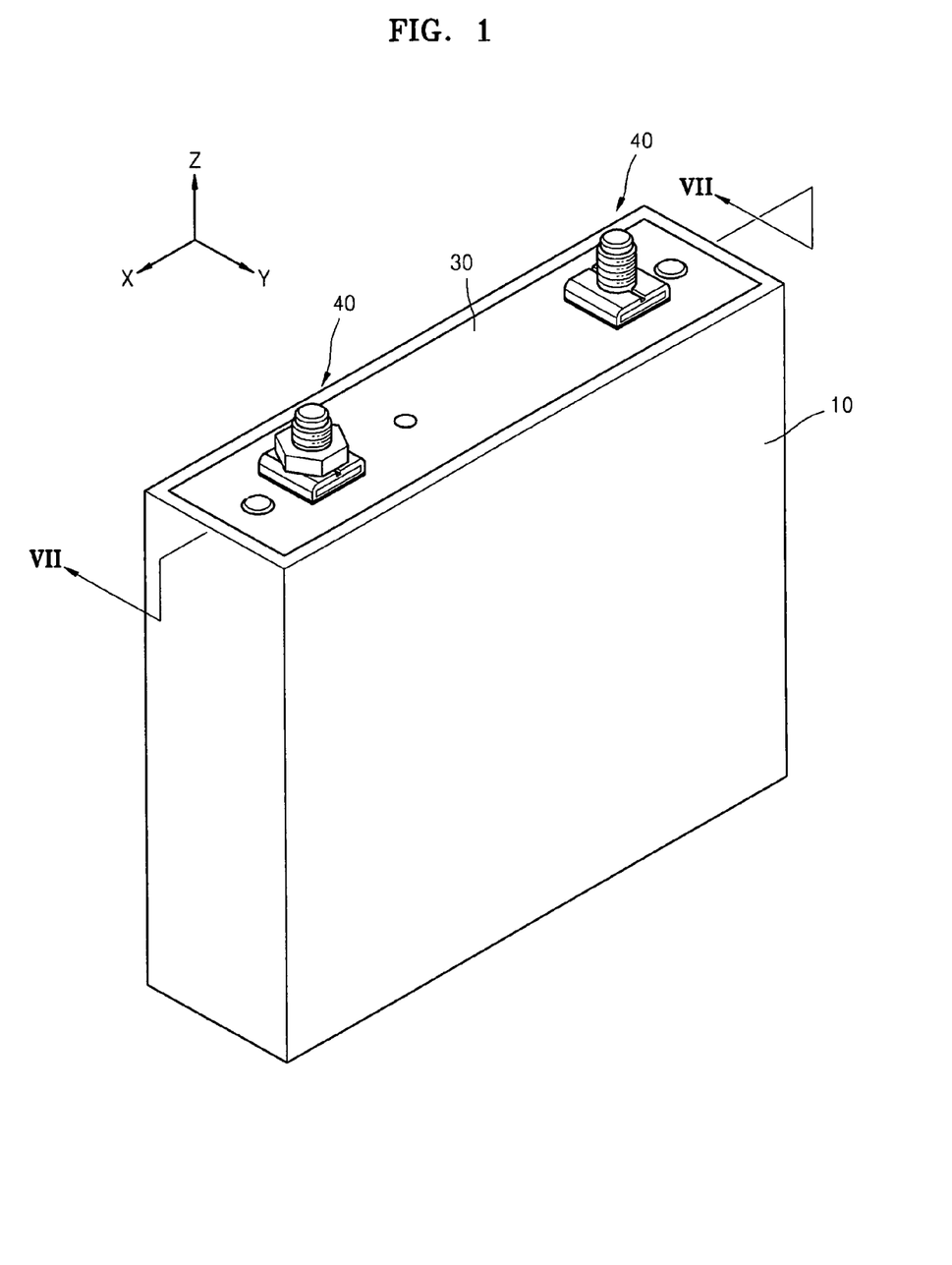
FIG. 1 illustrates a schematic perspective view of a secondary battery according to an embodiment.
Figure 2:
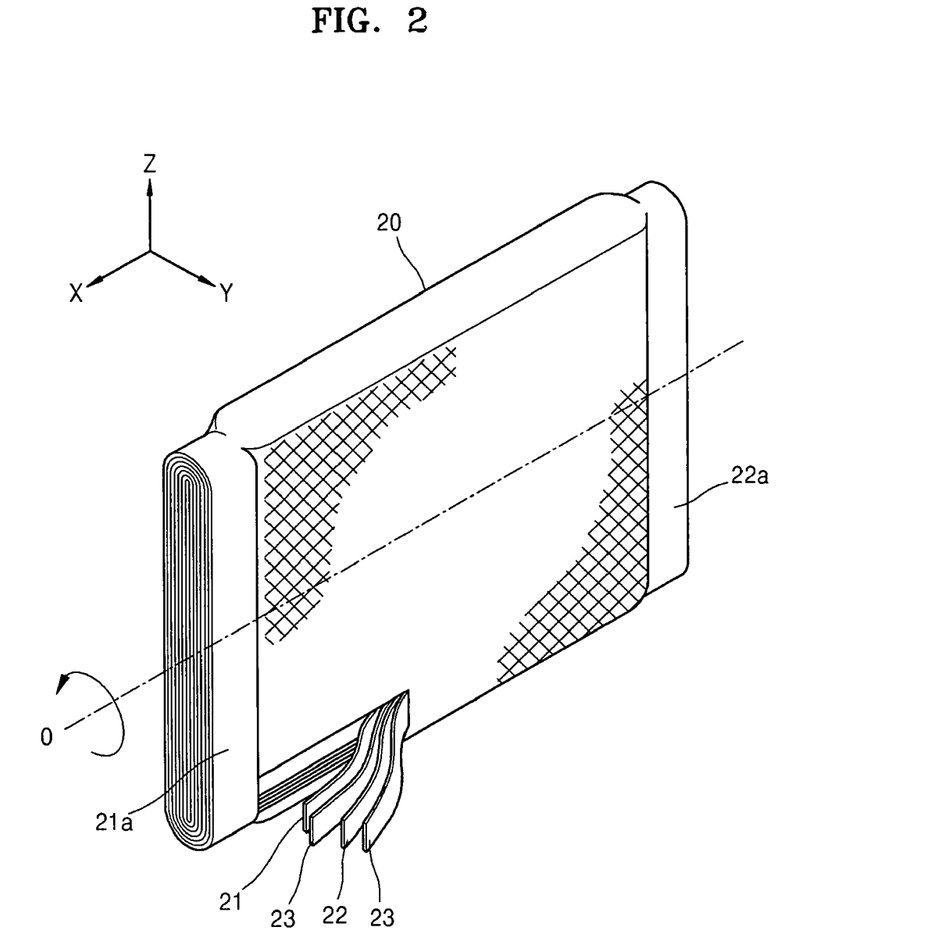
FIG. 2 illustrates a schematic perspective view of an electrode assembly of the secondary battery of FIG. 1.

FIG. 1 illustrates a schematic perspective view of a secondary battery according to an embodiment. FIG. 2 illustrates a schematic perspective view of an electrode assembly of the secondary battery of FIG. 1. Referring to FIGS. 1 and 2, the secondary battery may include an electrode assembly 20, a case 10 accommodating the electrode assembly 20 and including a cap assembly 30, and an electrode terminal 40.

As described above, the case 10 may accommodate the electrode assembly 20. The case 10 may be partially opened, i.e., may include an opening through which the electrode assembly 20 may be inserted. The case 10 may be formed of a conductive metal, e.g., aluminum, an aluminum alloy, or steel plated with nickel.

As illustrated in FIG. 1, the case 10 may have a hexagonal or cuboid shape that is long in an x axis direction. However, the embodiments are not limited thereto. For example, the case 10 may be modified to have various shapes, such as a cylindrical shape or a pouch shape.

The cap assembly 30 may be inserted into the opening of the case 10. At least one pair of the electrode terminals 40 may be disposed in the cap assembly 30. The pair of electrode terminals 40 may respectively function as a positive electrode terminal and a negative electrode terminal. The two electrode terminals 40 may be spaced apart from each other at a predetermined interval.

In the electrode assembly 20, a separator 23 may be interposed between a positive plate 21 and a negative plate 22. The electrode assembly 20 may be rolled in a jelly-roll fashion about a rotation axis O. The electrode assembly 20 may be rolled when a positive non-coated portion 21a and a negative non-coated portion 22a are folded so as to be exposed. The positive non-coated portion 21a and the negative non-coated portion 22a may be exposed at respective end portions of the electrode assembly 20.

The positive plate 21 may include a positive active material layer (not illustrated) including a positive active material slurry coated on a positive collector formed of a material including, e.g., aluminum. The positive plate 21 may also include the positive non-coated portion 21a that is not coated with the positive active material slurry. The positive active material slurry may include a positive active material.

The negative plate 22 may include a negative active material layer (not illustrated) including a negative active material slurry coated on a negative collector formed of a material including, e.g., nickel. The negative plate 22 may also include the negative non-coated portion 22a that is not coated with the negative active material slurry. The negative active material slurry may include a negative active material.

The separator 23 may prevent an electrical short circuit between the positive plate 21 and the negative plate 22.

Figure 3:
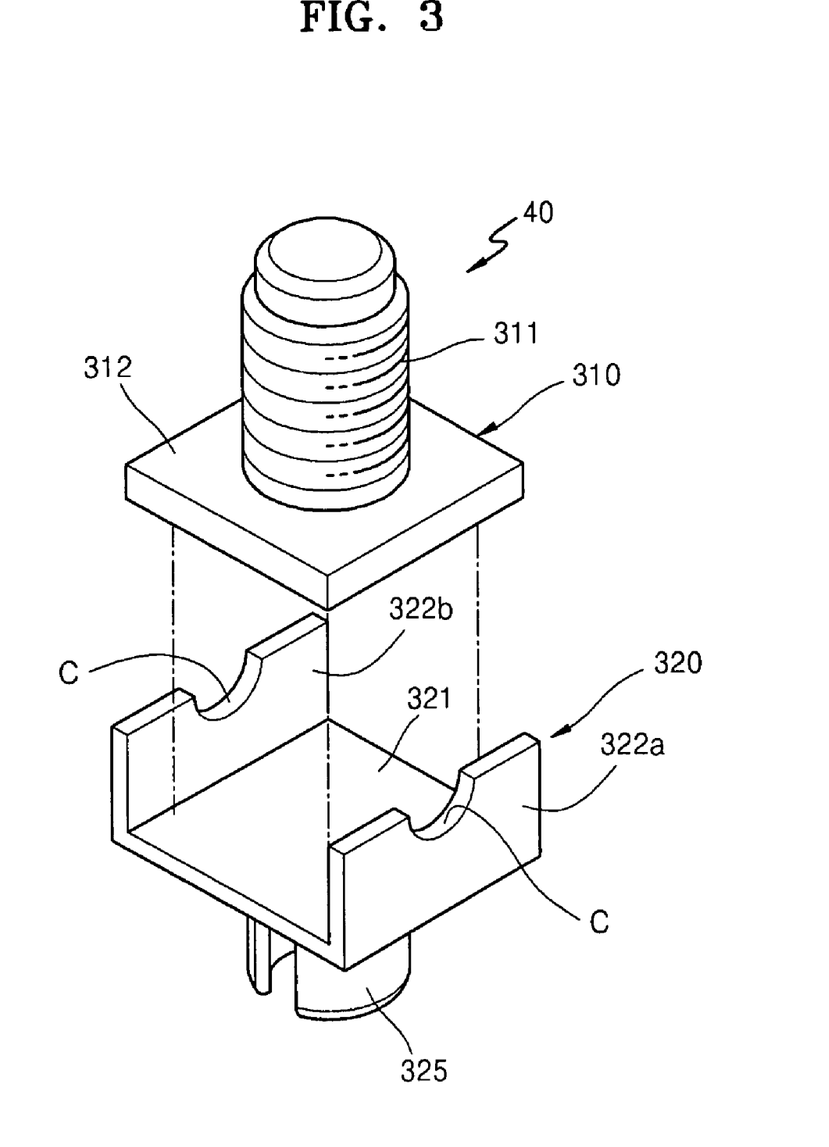
FIG. 3 illustrates a schematic exploded perspective view of an electrode terminal of the secondary battery of FIG. 1.
Figure 4:
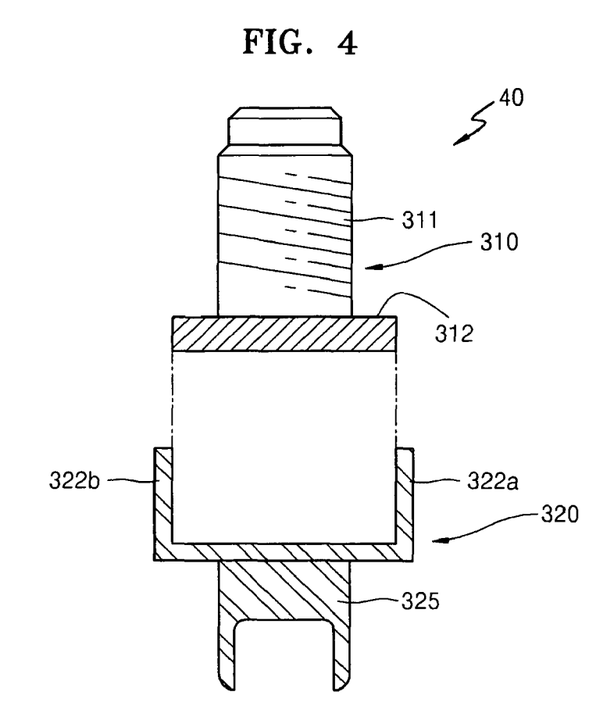
FIG. 4 illustrates a cross-sectional view of the electrode terminal of FIG. 3.

Hereinafter, the electrode terminal 40 will be described in detail with reference to the accompanying drawings. FIG. 3 illustrates a schematic exploded perspective view of the electrode terminal 40 included in the secondary battery of FIG. 1. FIG. 4 illustrates a cross-sectional view of the electrode terminal 40 of FIG. 3. Referring to FIGS. 3 and 4, the electrode terminal 40 may include a screw member 310 and a coupling member 320 under the screw member 310. The screw member 310 may include a pillar portion 311 including a screw thread on an outer peripheral surface thereof and a flange 312 at a base thereof. The coupling member 320 may include first and second pressing units 322a and 322b that press a lower portion of the screw member 310 and a shaft portion 325 that may be crimped and coupled to the cap assembly 30.

The pillar portion 311 may be disposed at an upper portion of the screw member 310 and the flange 312 may be disposed at a lower portion of the screw member 310. The flange 312 may have a diameter greater than that of the pillar portion 311.

The lower portion of the screw member 310 including the flange 312 may have a flat quadrilateral pillar shape, but the embodiments are not limited thereto. In particular, as long as the diameter of the flange 312 is greater than that of the pillar portion 311, the screw member 310 may have any shape. For example, the screw member 310 may have a cylindrical shape, similar to the pillar portion 311, or a hexagonal pillar shape.

An upper portion of the coupling member 320 may include a contact surface 321 to contact a lower surface of the screw member 310. The first and second pressing units 322a and 322b may be disposed at respective sides of the contact surface 321. In an unassembled state, the first pressing unit 322a and the second pressing unit 322b may be bent in a vertical direction with respect to the contact surface 321. Then, the first pressing unit 322a and the second pressing unit 322b may be bent so as to surround the flange 312 and to press the flange 312.

A groove C may be formed in each of the first pressing unit 322a and the second pressing unit 322b. For example, the groove C may correspond to a shape of the pillar portion 311. Accordingly, the first pressing unit 322a and the second pressing unit 322b may be easily bent and surround the flange 312 without being hindered by the pillar portion 311.

As illustrated in FIG. 3, the groove C may have a semicircular shape, but the embodiments are not limited thereto. For example, as long as the first pressing unit 322a and the second pressing unit 322b may be bent without being hindered by the pillar portion 311, the groove C may have any suitable shape.

The shaft portion 325 may be disposed at a lower portion of the coupling member 320. An end of the shaft portion 325 may have a hollow pipe shape and may be divided into at least two parts. The divided end portion of the shaft portion 325 may be crimped to be coupled to an internal surface of the cap assembly 30. In other words, the end portion of the shaft portion 325 may be bent so as to contact the internal surface of the cap assembly 30.

Figure 5:
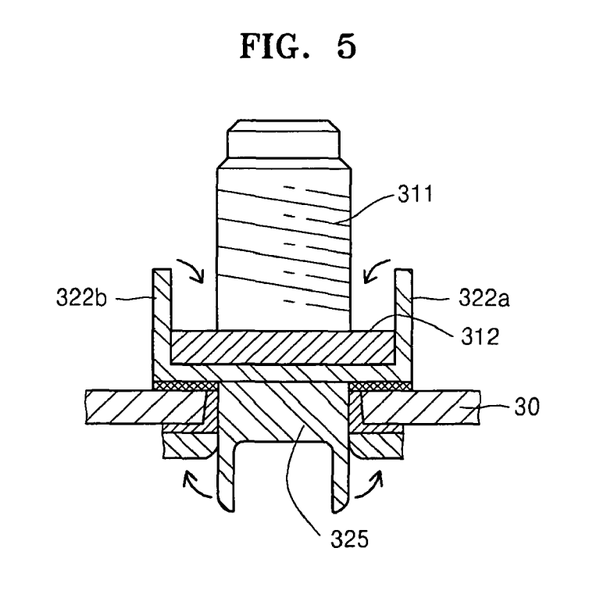
FIGS. 5 and 6 illustrate schematic cross-sectional views of sequential assembled states of an electrode terminal according to an embodiment.
Figure 6:
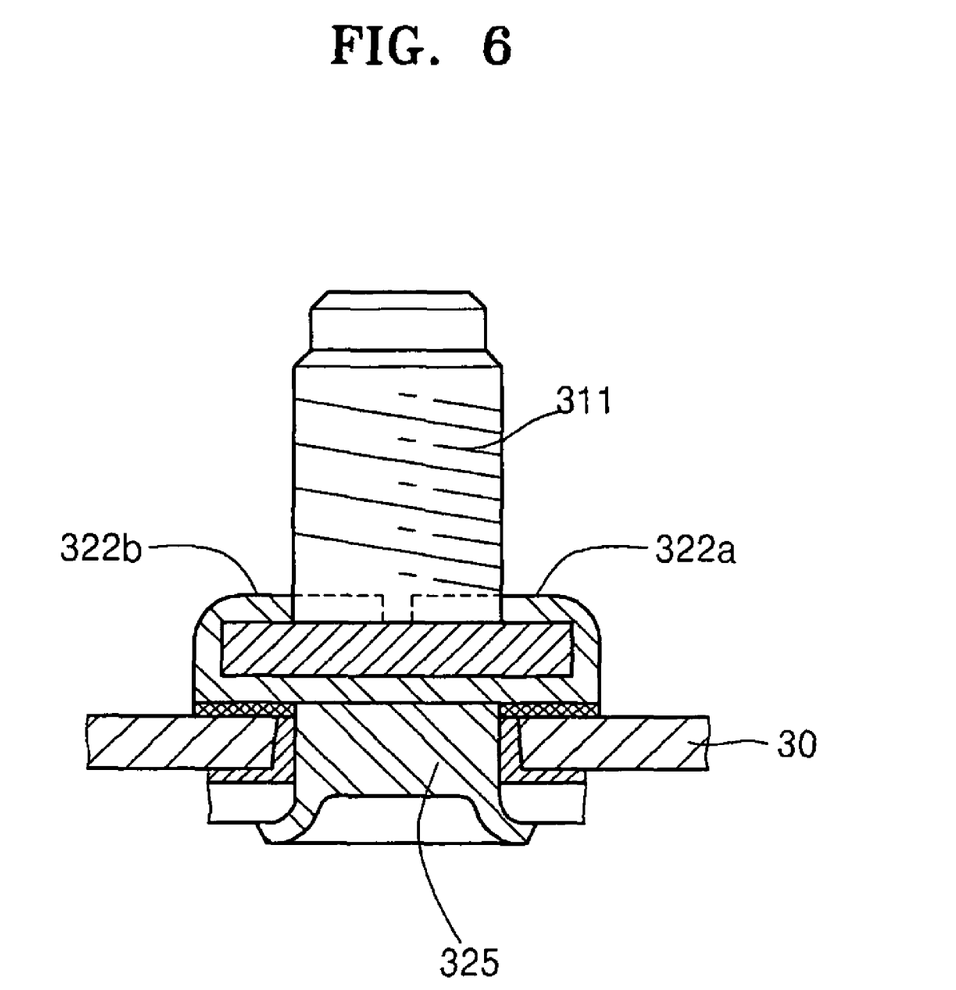

FIGS. 5 and 6 illustrate schematic cross-sectional views respectively showing coupling between the screw member 310 and the coupling member 320 and coupling between the coupling member 320 and the cap assembly 30. An upper portion of the coupling member 320 may be folded so as to be coupled to the screw member 310; and a lower portion of the coupling member 320 may be crimped to be coupled to the cap assembly 30.

The screw member 310 may be disposed on the coupling member 320. Then, the first pressing unit 322a and the second pressing unit 322b may be bent so as to surround the flange 312. Thus, a coupling state may be maintained as illustrated in FIG. 6. The first and second pressing units 322a and 322b, which may be completely coupled to the screw member 310, may surround the flange 312. The shaft portion 325 of the coupling member 320 may pass through a hole in the cap assembly 30. Then, the end portion of the shaft portion 325 may be bent so as to contact the internal surface of the cap assembly 30. As the length of the end portion of the shaft portion 325 is increased, the coupling between the coupling member 320 and the cap assembly 30 may be improved.

Coupling between the screw member 310 and the coupling member 320 may be improved because of, e.g., a structure in which the first pressing unit 322a and the second pressing unit 322b surround the flange 312. The structure may prevent the screw member 310 from being separated from the coupling member 320 due to an external vibration or impact. The coupling between the screw member 310 and the coupling member 320 may be further reinforced because of, e.g., a structure in which the first and second pressing units 322a and 322b have grooves C. For example, even if the screw member 310 moves in a horizontal direction, the groove C may function as an obstacle, and thus the screw member 310 may not be separated from the coupling member 320.

Figure 7:
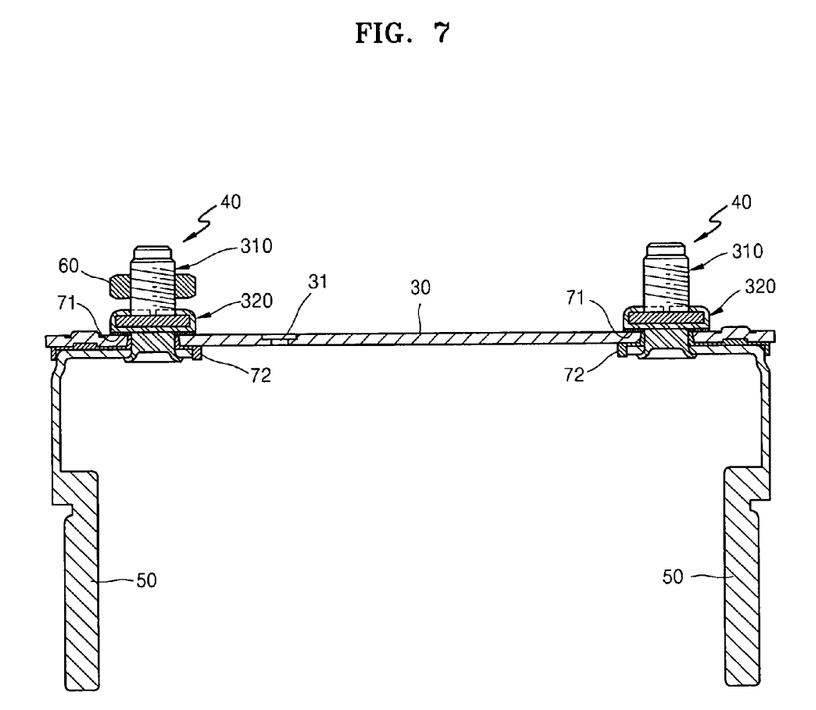
FIG. 7 illustrates a cross-sectional view taken along a line VII-VII of FIG. 1.

FIG. 7 illustrates a cross-sectional view taken along a line VII-VII of FIG. 1. In FIG. 7, the case 10 and the electrode assembly 20 are omitted for convenience of description.

An electrolyte inlet may be formed in the cap assembly 30. When the cap assembly 30 is coupled to the opening of the case 10, if an electrolyte is injected into the case 10 through the electrolyte inlet, the cap assembly 30 may be closed by a cover 31.

At least one pair of electrode terminals 40, which may be spaced apart from each other, may be disposed in the cap assembly 30. Each electrode terminal 40, as described above, may include the screw member 310 and the coupling member 320.

The shaft portion 325 may pass through the hole in the cap assembly 30. A first sealing member 71 may be interposed between the cap assembly 30 and the coupling member 320. The first sealing member 71 may improve a seal between the coupling member 320 and the cap assembly 30. The first sealing member 71 may also perform an electrical insulating function. The first sealing member 71 may include various materials, e.g., polyvinyl chloride (PVC), polychlorinated biphenyl (PCB), or a resin rubber.

After the shaft portion 325 passes through the cap assembly 30, the end portion of the shaft portion 325 may be bent so as to contact the internal surface of the cap assembly 30, i.e., may be crimped so as to be coupled to the cap assembly 30. Here, a second sealing member 72 and a tap 50 may be interposed between the end portion of the shaft portion 325 and the internal surface of the cap assembly 30.

The second sealing member 72 may seal the hole in the cap assembly 30 through which the shaft portion 325 has passed. The second sealing member 72 may also improve sealing performance between the cap assembly 30 and the coupling member 320. The second sealing member 72 may also serve an electrical insulating function, similar to the first sealing member 71. The second sealing member 72 may also include various materials, e.g., PVC, PCB, or a resin rubber.

The tap 50 may electrically connect the electrode terminal 40 and the electrode assembly 20. The tap 50 may be bent in a vertical direction. One end of the tap 50 may be connected to the electrode terminal 40 and another end thereof may be connected to the electrode assembly 20. For example, the one end of the tap 50 may contact the end portion of the shaft portion 325 and the other end of the tap 50 may contact the positive non-coated portion 21a or the negative non-coated portion 22a of the electrode assembly 20.

A nut 60 may be used when a plurality of secondary batteries are connected to one another with a bus bar (not illustrated). When the plurality of secondary batteries are connected to one another in, e.g., series, a positive electrode terminal disposed in any one of the plurality of secondary batteries and a negative electrode terminal disposed in another one of the plurality of secondary batteries may be connected to each other. For example, the nut 60 may be coupled to the screw member 310 so as to fix the bus bar.

A secondary battery according to another embodiment may include an electrode assembly 20, a case 10, and a cap assembly 30, similar to the previous embodiment. However, the present embodiment is different from the previous embodiment in terms of a structure of the electrode terminal 40. Descriptions of the electrode assembly 20, the case 10, and the cap assembly 30 that constitute the secondary battery are the same as those of the components described in the previous embodiment, and thus only differences between the previous embodiment and the present embodiment will be described below.

Figure 8:
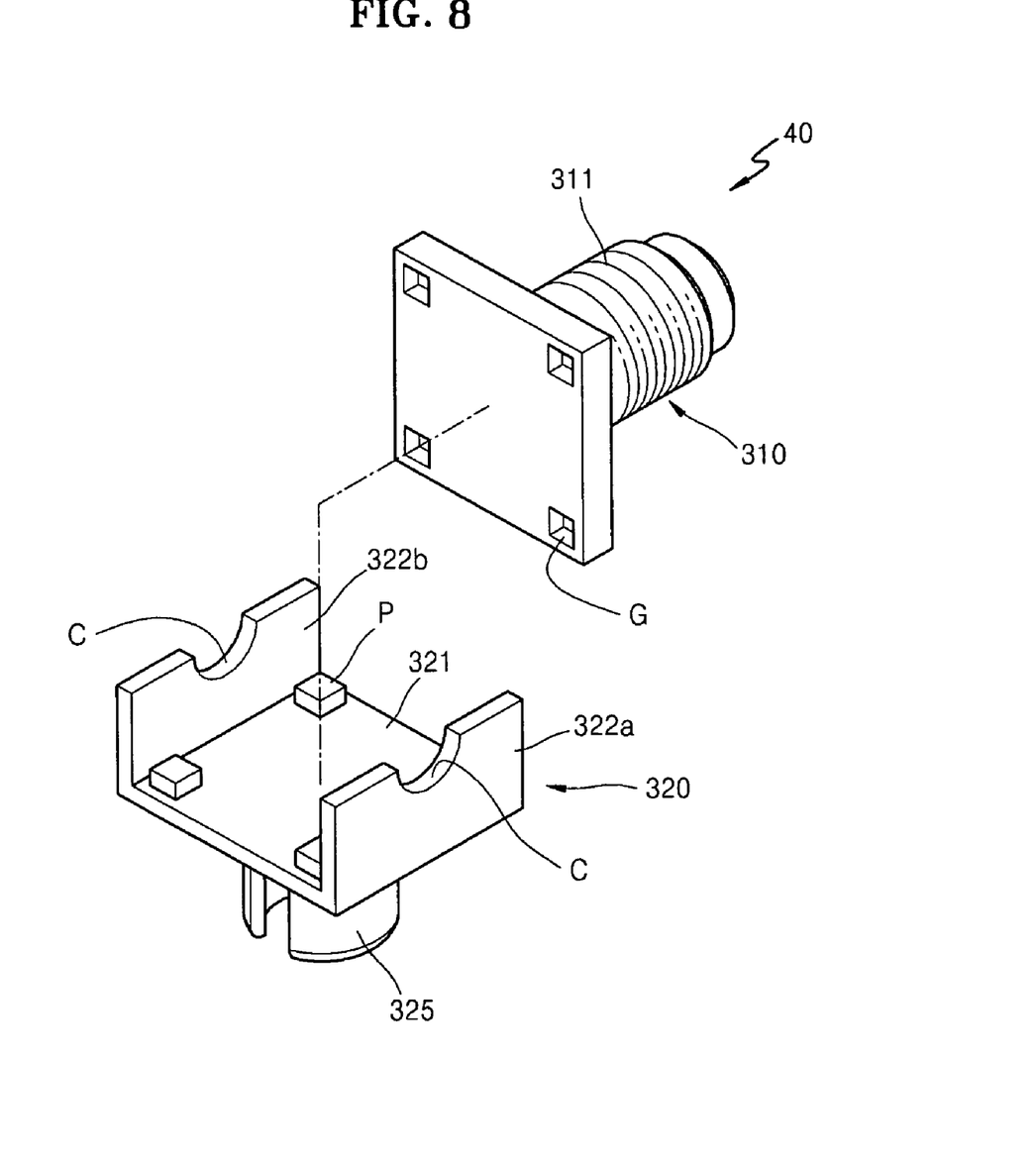
FIG. 8 illustrates an exploded perspective view of an electrode terminal according to another embodiment.

FIG. 8 illustrates an exploded perspective view of the electrode terminal 40 according to another embodiment. Referring to FIG. 8, a coupling bump P may be disposed on a contact surface 321 of a coupling member 320. At least one coupling bump P may be formed. A coupling groove G may be formed in a lower portion of a screw member 310 so as to correspond to the coupling bump P. Thus, the coupling bump P may be inserted into the coupling groove G.

Rotation of the screw member 310 in one direction on the contact surface 321 and/or separation from the contact surface 321 may be prevented because of the coupling bump P and the coupling groove G. In addition, even through an external vibration or an impact may be applied, separation of the screw member 310 from the coupling member 320 may be prevented. That is, coupling between the screw member 310 and the coupling member 320 may be further improved because of the coupling bump P.

As illustrated in FIG. 8, the coupling bump P may be disposed in a corner of the contact surface 321, but the embodiments are not limited thereto. For example, the coupling bump P may be disposed in a center portion of the contact surface 321. In addition, the coupling bump P may have not only a hexagonal or cuboid shape but also have a hemispherical shape or a polyhedral shape.

Figure 9:
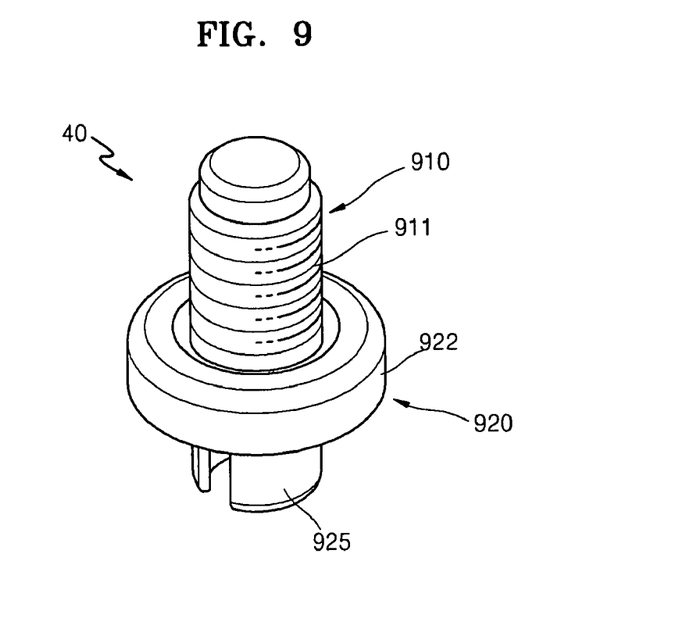
FIG. 9 illustrates a perspective view of an electrode terminal according to yet another embodiment.
Figure 10:
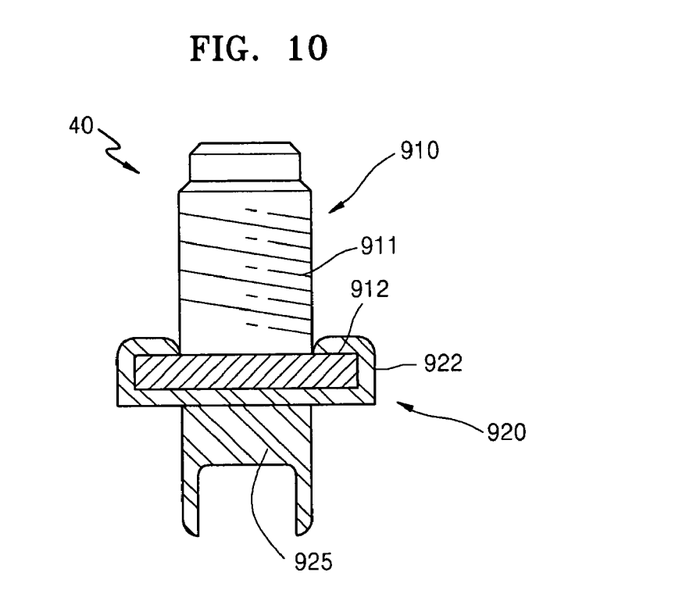
FIG. 10 illustrates a cross-sectional view of the electrode terminal of FIG. 9.

A secondary battery according to yet another embodiment may include an electrode assembly 20, a case 10, and a cap assembly 30 similar to the previous embodiments. However, in the previous embodiment, the first and second pressing units 322a and 322b may be bent at both or opposing sides of the flange 312. In the present embodiment, a pressing unit 922 may be bent so as to surround an entire lower portion of a screw member 910 including the flange 312. Descriptions of the electrode assembly 20, the case 10, and the cap assembly 30 that constitute the secondary battery are the same as those of the components described in the first embodiment, and thus only differences between the previous embodiment and the present embodiment will be described below.

FIG. 9 illustrates a schematic perspective view of an electrode terminal 40 according to yet another embodiment. FIG. 10 is a cross-sectional view of the electrode terminal of FIG. 9. Referring to FIGS. 9 and 10, a lower portion of the screw member 910 including the flange 912 may have, e.g., a flat cylindrical shape.

A pressing unit 922 of a coupling member 920 may be bent so as to surround the entire lower portion of the screw member 910 having a cylindrical shape. In an implementation, the coupling member 920 may be bent through, e.g., a curling process. That is, the pressing unit 922 may surround the entire lower portion of the screw member 910, thereby forming a frame having a diameter with a circular shape.

In the present embodiment, although not illustrated, a coupling bump P and a coupling groove G may be formed, similar to the previous embodiment, thereby preventing idling or moving of the screw member 910 during the curling process.

According to the embodiments, since the pressing units 322a and 322b or the pressing unit 922 of the coupling member 320 or 920 may be coupled to the screw member 310 or 910 so as to surround the lower portion of the screw member 310 or 910, separation of the screw member 310 or 910 from the coupling member 320 due to an external vibration or an internally generated heat may be completely prevented. In addition, the coupling member 320 or 920 may be crimped to be coupled to the cap assembly 30, thereby enhancing assembly and a seal therebetween. In particular, sealing performance may be further enhanced through the sealing members 71 and 72.

Furthermore, since an electrode terminal of an embodiment may be assembled through crimping, folding, or curling, an additional welding process during assembly of the electrode terminal and forming of an electrical connection between secondary batteries may be unnecessary. Thus, generation of a defect due to welding may be prevented and manufacturing time and manufacturing costs may be reduced.

As described above, according to one or more of the above embodiments, assembly and durability of an electrode terminal may be greatly improved through structures including a screw member and a coupling member.

According to an embodiment, deformation of an electrode terminal or separation of the electrode terminal due to an external vibration or heat generated in the secondary battery itself may be prevented, thereby improving durability and assembly of the secondary battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode terminal, comprising:
    a screw member, the screw member including a flange on a lower outer peripheral surface thereof; and
    a coupling member including:
        an upper portion bent so as to surround at least a part of the flange, and
        a lower portion bent so as to contact an internal surface of a cap assembly and coupled to the cap assembly.

2. The electrode terminal structure as claimed in claim 1, wherein:
    the screw member includes a pillar portion, the pillar portion including a screw thread on an upper outer peripheral surface thereof, and
    the flange has a diameter greater than a diameter of the pillar portion.

3. The electrode terminal structure as claimed in claim 1, wherein the upper portion of the coupling member includes:
    a first pressing unit that is bent so as to surround the flange in one direction; and
    a second pressing unit that is bent so as to surround the flange in another direction.

4. The electrode terminal structure as claimed in claim 3, wherein at least one of the first pressing unit and the second pressing unit includes a groove therein, the groove corresponding to a shape of the screw member.

5. The electrode terminal structure as claimed in claim 1, wherein the upper portion of the coupling member is coupled to the screw member by being bent so as to surround an entire lower portion of the screw member that includes the flange and is thereby coupled to the flange.

6. The electrode terminal structure as claimed in claim 1, wherein:
    the coupling member includes at least one coupling bump thereon, and
    the lower portion of the screw member includes at least one coupling groove thereon, the coupling groove corresponding to the coupling bump.

7. The electrode terminal structure as claimed in claim 1, wherein:
    the lower portion of the coupling member includes a shaft portion including an end portion, the end portion having a hollow pipe shape, and the end portion of the shaft portion is divided into at least two sections, the divided end portion of the shaft portion being bent so as to contact the internal surface of the cap assembly.

8. A secondary battery, comprising:

a case accommodating an electrode assembly;

a cap assembly sealing the case; and at least one pair of electrode terminals on the cap assembly, the at least one pair of electrode terminals being electrically connected to the electrode assembly, wherein each electrode terminal includes:

a screw member, the screw member including a flange on a lower outer peripheral surface thereof; and a coupling member including:

an upper portion bent so as to surround at least a part of the flange, and a lower portion bent so as to contact an internal surface of a cap assembly and coupled to the cap assembly.

9. The secondary battery as claimed in claim 8, wherein:

the lower portion of the coupling member passes through a hole in the cap assembly, and a first sealing member including an insulating material is between the coupling member and an upper outer surface of the cap assembly.

10. The secondary battery as claimed in claim 8, wherein a second sealing member including an insulating material is between the coupling member and the internal surface of the cap assembly.

11. The secondary battery as claimed in claim 8, further comprising a tap between the coupling member and the internal surface of the cap assembly so as to electrically connect the electrode terminal and the electrode assembly, the tap being bent at a predetermined angle.

12. The secondary battery as claimed in claim 8, wherein:

the screw member includes a pillar portion, the pillar portion including a screw thread on an upper outer peripheral surface thereof, and the flange has a diameter greater than a diameter of the pillar portion.

13. The secondary battery as claimed in claim 8, wherein the upper portion of the coupling member includes:

a first pressing unit that is bent so as to surround the flange in one direction; and a second pressing unit that is bent so as to surround the flange in another direction.

14. The secondary battery as claimed in claim 13, wherein at least one of the first pressing unit and the second pressing unit includes a groove therein, the groove corresponding to a shape of the screw member.

15. The secondary battery as claimed in claim 8, wherein the upper portion of the coupling member is coupled to the screw member by being bent so as to surround an entire lower portion of the screw member that includes the flange and is thereby coupled to the flange.

16. The secondary battery as claimed in claim 8, wherein:

the coupling member includes at least one coupling bump thereon, and the lower portion of the screw member includes at least one coupling groove thereon, the coupling groove corresponding to the coupling bump.

17. The secondary battery as claimed in claim 8, wherein:

the lower portion of the coupling member includes a shaft portion including an end portion, the end portion having a hollow pipe shape, and the end portion of the shaft portion is divided into at least two sections, the divided end portion of the shaft portion being bent so as to contact the internal surface of the cap assembly.

* * * * *